(12) United States Patent
Fourrey et al.

(10) Patent No.: US 7,243,998 B2
(45) Date of Patent: Jul. 17, 2007

(54) AUTOMOBILE VEHICLE SEAT BACK FRAME, AND PROCESS FOR MANUFACTURING SUCH A FRAME

(75) Inventors: François Fourrey, Corquilleroy (FR); Gilles Petitjean, Boulogne Billancourt (FR); Jean-Louis Lenarvor, Breux-Jouy (FR)

(73) Assignee: Faurecia Sieges D'Automobile, Nanterre (FR)

( * ) Notice: Subject to any disclaimer, the term of this patent is extended or adjusted under 35 U.S.C. 154(b) by 350 days.

(21) Appl. No.: 10/872,334

(22) Filed: Jun. 18, 2004

(65) Prior Publication Data
US 2005/0023880 A1 Feb. 3, 2005

(30) Foreign Application Priority Data
Jun. 20, 2003 (FR) .................................. 03 07521

(51) Int. Cl.
*A47C 7/02* (2006.01)
(52) U.S. Cl. ............... 297/452.15; 297/452.18; 297/452.12
(58) Field of Classification Search .......... 297/452.12, 297/452.14, 452.15, 452.18, 452.65, DIG. 2
See application file for complete search history.

(56) References Cited

U.S. PATENT DOCUMENTS

| | | | | |
|---|---|---|---|---|
| 3,053,569 A | * | 9/1962 | Clark, Jr. ................... | 297/111 |
| 4,246,734 A | * | 1/1981 | Fogle et al. ............. | 52/309.16 |
| 4,492,408 A | * | 1/1985 | Lohr ......................... | 297/344.1 |
| 5,895,096 A | * | 4/1999 | Massara ................. | 297/452.34 |
| 6,056,366 A | * | 5/2000 | Haynes et al. ......... | 297/452.18 |
| 6,260,924 B1 | * | 7/2001 | Jones et al. ............ | 297/452.18 |
| 6,296,291 B1 | * | 10/2001 | Lansinger ................ | 296/65.16 |
| 6,386,638 B1 | * | 5/2002 | Strauch ................. | 297/452.18 |
| 6,688,700 B2 | * | 2/2004 | Gupta et al. ........... | 297/452.18 |
| 2002/0050413 A1 | * | 5/2002 | Renault ..................... | 180/69.1 |
| 2003/0020319 A1 | | 1/2003 | Adams et al. | |
| 2003/0117003 A1 | * | 6/2003 | Fourrey et al. ........ | 297/452.18 |

FOREIGN PATENT DOCUMENTS

| | | |
|---|---|---|
| DE | 100 55 769 A1 | 5/2002 |
| DE | 101 54 472 A1 | 5/2003 |
| EP | 0 160 927 A2 | 11/1985 |
| EP | 037 2339 | 6/1990 |
| FR | 2 735 7321 | 12/1996 |

* cited by examiner

*Primary Examiner*—David Dunn
*Assistant Examiner*—Sarah B. McPartlin
(74) *Attorney, Agent, or Firm*—Patterson, Thuente, Skaar & Christensen, P.A.

(57) ABSTRACT

The frame of the automobile vehicle seat back comprises a body extending over a general plane and functional components joined to the body, serving notably to attach or reinforce it. It is made in one piece from an overmoulded plastic material that forms the body, reinforced by a reinforcing strip comprising a woven band of mineral and plastic material fibers, the reinforcing strip extending in the general plane of the frame and interconnecting at least two of the functional components comprising inserts at least partially embedded in the body.

11 Claims, 3 Drawing Sheets

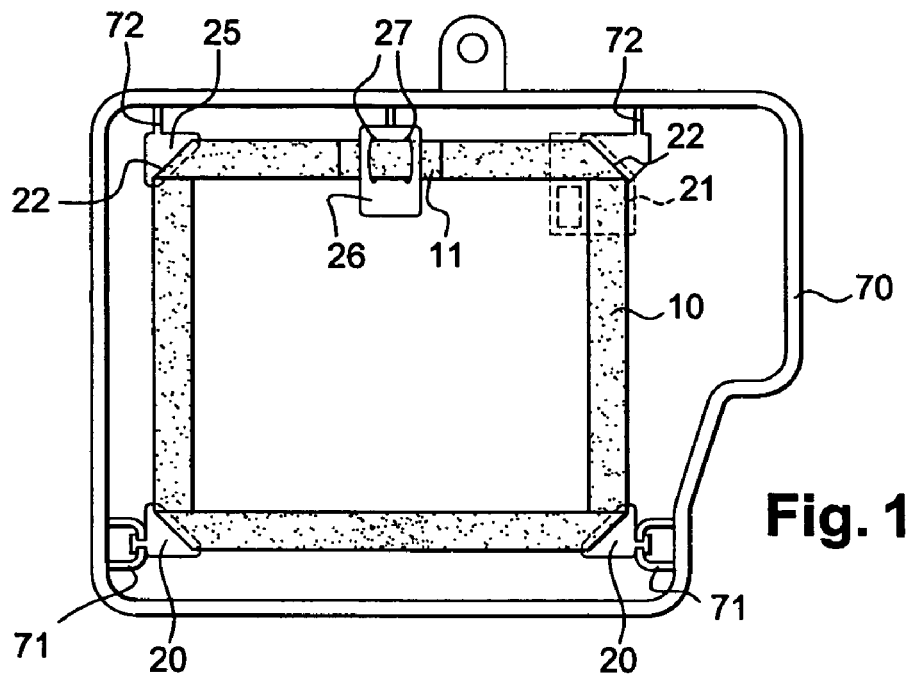
Fig. 1
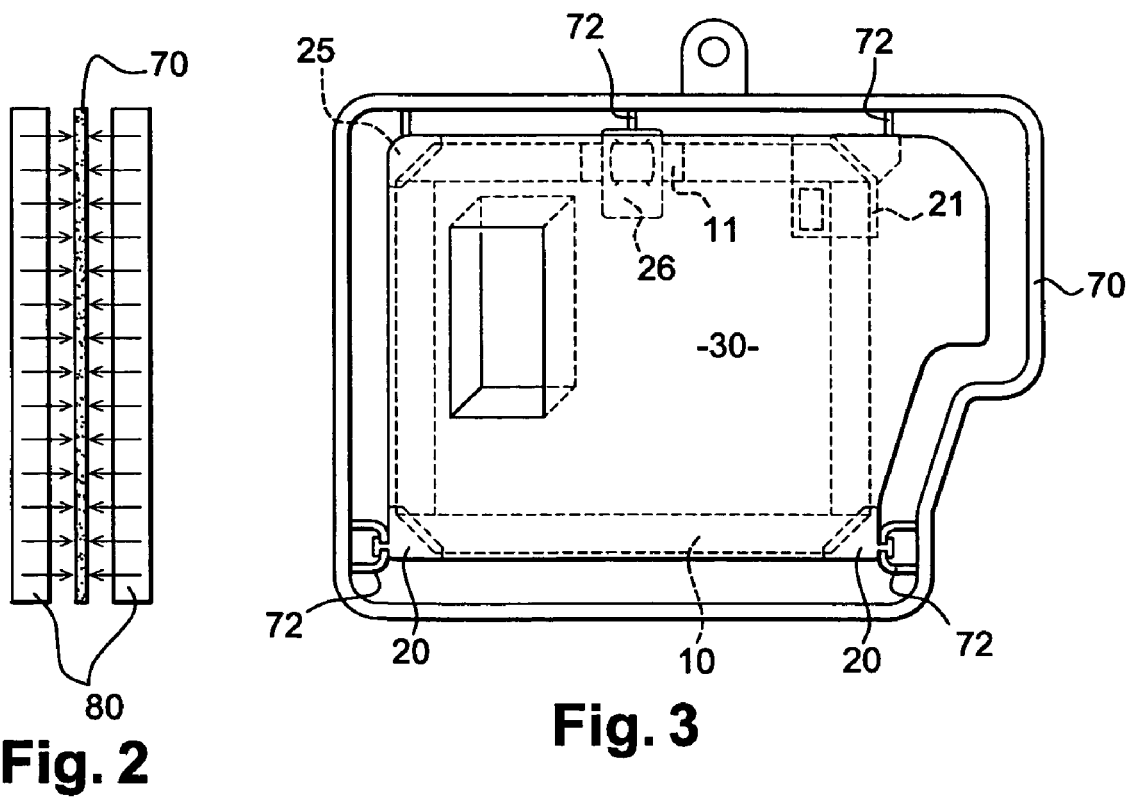
Fig. 2
Fig. 3

AUTOMOBILE VEHICLE SEAT BACK FRAME, AND PROCESS FOR MANUFACTURING SUCH A FRAME

RELATED APPLICATIONS

The present application claims priority under 35 USC §119 to a French national patent application, FRANCE No. 0307521, filed Jun. 20, 2003, and entitled "Automobile Vehicle Seat Back Frame, and Process for Manufacturing such a Frame."

FIELD OF THE INVENTION

This invention concerns the domain of the automobile seat, and more specifically a frame forming the back of an automobile seat, and its manufacturing process.

Conventionally, these frames are made from metal tubes and sheets that are generally formed by bending, piercing, drawing and welding. These operations, however, require several successive operations performed at different workstations, which complicates manufacture and necessitates transfers from one workstation to the next. This also creates a large amount of waste in the raw materials used, and in the tube and sheet metal offcuts.

Moreover, frame reworks are necessary to add particular functions such as the attachment of a seat back hinge to the seat pan or the attachment of means to support a headrest, etc.

In addition, reinforcing parts have to be added, when the stresses the frame might be subjected to so require for reasons of safety, for the attachment of safety belts or the attachment of an infant seat, for example. Such reinforcing parts increase the number of parts to produce and manage, increase the weight of the seat and result in additional assembly operations.

We also know from document EP 0372339 for example, of seat back frames made from injected plastic, in which the side vertical members and the upper crosspiece are made from U-shaped sections, with the sections of the vertical members opening to the exterior of the seat and featuring reinforcing ribs in the interior of the U-section. Moreover, the bottom ends of the vertical members are provided with reinforcements for attaching the means of joining the seat back to the seat pan and enabling it to be folded down, but no information on the method of producing and using these reinforcements, and the strength of such joining means, even if locally reinforced at the bottom of the side vertical members, risks being insufficient to withstand the heavy loads applied to the seat back. More specifically, only the plastic material of the seat back ensures the joint between the two reinforcing parts at the bottom of the vertical members, and cannot reliably prevent these vertical members from separating and being pushed apart, if subjected to high loads in an accident, for example. Furthermore, the seat back presented is made from several parts because the moulding of the ribs in the vertical members requires the members to be open, therefore they must be closed by covers after moulding the frame to conceal the ribs and provide a finish to the frame.

SUMMARY OF THE INVENTION

The aim of the invention described herein is to solve these problems, and more particularly to replace the traditionally known seat back frames by frames based on composite plastic material, bringing reductions in weight and cost and in the number of parts, and facilitating integration of the various functions that might be desired.

With these objectives in mind, the subject of the invention is an automobile vehicle seat back frame, featuring a body extending in a general plane and produced as a one-piece moulded plastic part, and functional components associated with the body, in particular to attach or reinforce it.

In accordance with the invention, the frame is characterized in that the body of moulded plastic material is reinforced by a reinforcing strip comprising a woven band of mineral and plastic material fibres; the reinforcing strip extending in the general plane of the frame and interconnecting at least two of the functional components that comprise inserts at least partially embedded in the body.

As will be more clearly understood later, such a structure is particularly easy to produce, since it is formed from a single part and can provide for significant weight savings without sacrificing mechanical strength, particularly at the location of the attaching or reinforcing components. Indeed, a common problem encountered in the production of such composite structures for diverse applications is the joining of the inserts—which serve to fulfill various functions and are usually made of metal—with the plastic material which overmoulds, at least partially, the inserts.

The functional components required for an automobile seat back include the frame attaching components such as hinges to allow the seat back to pivot on the seat pan, or components for attaching the upper section of the seat back to the vehicle chassis. The components can also be reinforcing parts, located at points where the frame risks being particularly heavily stressed, such as in the safety belt locking or attachment zones, etc. Overmoulding of the inserts that constitute these components with the plastic material certainly maintains their relative position but does not necessarily provide a very strong joint, particularly with respect to tensile stresses, between the various inserts overmoulded in the same structure.

The use of the reinforcing strip in accordance with the present invention to connect these various inserts considerably increases their strength, taking advantage of the very strong mechanical reinforcement provided by the constituent fibres of the woven strip. More specifically, the strip can be positioned around the frame, such that it interconnects the various inserts, as a continuous loop, the ends of the strip being firmly joined together and this joint being reinforced by the overmoulding of the plastic material of the body, thereby providing a connection between the inserts that displays very high tensile strength to prevent the inserts from being separated from one another.

Furthermore, the flexibility of the woven band, which resembles a flat strap, means that it is easy to put in place during manufacturing, by interconnecting the various inserts that are propositioned and held in position in a manufacturing supporting frame before moulding the plastic material of the seat back over the assembly.

The reinforcing strip is preferably a woven band comprising glass fibres and thermoplastic fibres, particularly in polypropylene (PP) or polyethylene terephthalate (PET), as is the case for example in TWINTEX®, which combines high tensile strength and good impact and temperature resistance with a high level of rigidity.

The plastic material that overmoulds the strip and the inserts to form the body of the frame can be thermoplastic or thermosetting. The preferable choice will be a PET roving filled with glass fibres. The materials shall be chosen so that the resulting seat back can be recycled if necessary.

In a particular arrangement, the inserts interconnected by the reinforcing strip are at least partially inserted into the body of the seat back frame and feature obliquely angled slits or cutaways through which the reinforcing strip is passed. Each insert constitutes a change-of-direction point for the strip, that is to say that an end of the strip passed through the slit or cutaway in a roughly horizontal direction, for example, will leave it in a roughly vertical direction, which can, for example, allow one and the same strip to be used to connect inserts situated in the four corners of a rectangle corresponding to the basically rectangular shape of the seat back. The strip can of course also be arranged, instead of or in addition to, the rectangular configuration described above, in diagonal, transverse or oblique directions, etc., to interconnect inserts located in diagonally opposing positions on the seat back, for example.

In another configuration, the inserts interconnected by the reinforcing strip are made from suitably bent metal wire featuring oblique sections around which the reinforcing strip is passed, and possibly protruding parts, with the oblique sections constituting the change-of-direction points, in a similar manner to that described above.

In particular cases of course, the strip can also be passed over, through or around any elements of these inserts in other directions, or one end of the strip can be secured to them by a buckle. These different configurations will depend on the shape of the seat back and the directions of the stresses exerted on the seat back frame as a whole and on the inserts.

These parts can be made from sheet metal cut to shape, bent wire, parts prefabricated by moulding or other processes in diverse metallic or non-metallic materials.

Plastic material can be moulded at the same time as the frame body over the protruding sections of the inserts to constitute functional parts, such as trunnions for attaching and/or pivoting the seat back at its base. In this case the protruding section of the insert constitutes an internal reinforcement of the trunnion, which itself is essentially formed by the plastic material that encapsulates the protruding section. In other cases the plastic material could be moulded over the insert to provide a coating of limited thickness encapsulating the protruding section of the insert.

The term protruding sections as used herein means sections that protrude locally with respect to the general outline of the frame body.

The protruding sections of these parts can also be left bare, that is to say not coated with plastic material, to constitute attaching components, either for attaching the seat back to the seat pan or the vehicle chassis, or to permit the temporary or permanent attachment of other components or add-on accessories to the seat back frame, such as headrests, removable infant seats, etc.

In a complementary configuration, a closing plate is fixed to the body of the composite frame, preferably by welding, to constitute the rear surface of the seat back. This plate is prepared independently of the frame and is preferably made from a fibre-reinforced thermoplastic composite material, of the TWINTEX® type. Again preferably, the closing plate is co-calendered with a non-woven thermoplastic-based carpeting material, to give the rear surface of the seat back a surface finish directly. The closing plate can be flat and include a uniform reinforcement of fibres distributed over its entire surface, but it can also be worked, in a similar manner to the frame body, with areas of whatever shape and/or reinforcing strips placed specifically in areas where greater resistance might be required.

The invention also concerns a process for manufacturing an automobile vehicle seat back as defined above, the frame extending over a general plane and featuring functional components, particularly attaching or reinforcing components, with the process being characterized in that:

the functional components comprising inserts are interconnected by a reinforcing strip, comprising a woven band of mineral and plastic fibres, the assembly thus formed is placed in a manufacturing supporting frame, attaching the inserts to the support frame in such a way that the reinforcing strip is pulled taut between the various inserts it interconnects, the assembly is heated, the heated assembly is placed in an injection mould, where the plastic material is injected such that it overmoulds the strip and, at least partially, the inserts, to form a body for the composite frame.

In a preferential arrangement, after demoulding the resulting composite frame, a separately prepared closing plate designed to form the rear surface of the seat back is then fixed to the body by vibration welding.

Other characteristics and advantages of the invention will appear in the following description of an automobile vehicle rear seat back frame in accordance with the invention, and of its manufacture.

BRIEF DESCRIPTION OF THE DRAWINGS

FIG. 1 depicts a preassembled strip/insert assembly attached to a supporting frame to form part of the seat back frame of the present invention.

FIG. 2 depicts a supporting frame of the seat back frame between two heating panels.

FIG. 3 depicts the seat back frame with the body of the seat back frame overmoulding the strip and inserts.

DETAILED DESCRIPTION OF THE PREFERRED EMBODIMENTS

Figure 4:
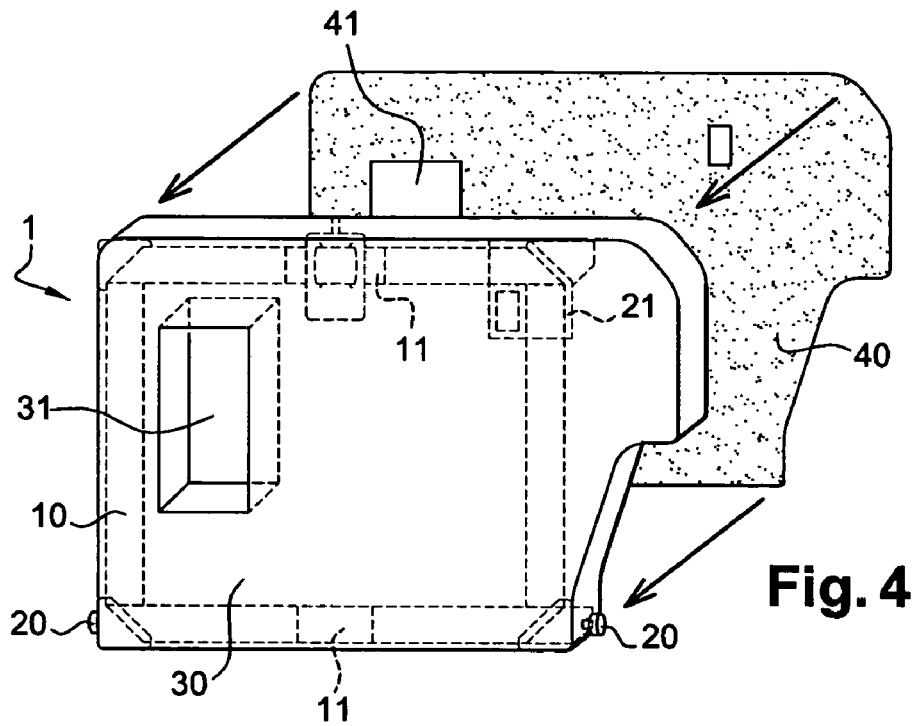
FIG. 4 depicts the seat back frame with a reinforcing strip interconnecting a plurality of inserts.

The seat back frame 1 obtained by the process in accordance with the invention essentially comprises, as can be seen in FIG. 4, a reinforcing strip 10 comprising a band in TWINTEX® or woven glass fabric, measuring 50 to 70 mm in width for example, that interconnects inserts 20, 21, 25, 26. Inserts 20, 21 and 25 are positioned in each corner of the seat back for example, and feature oblique slits 22 cut in a constituent part in sheet metal, as can be seen more clearly in FIGS. 5 and 8 for example, or equivalent areas provided on a bent wire illustrated in FIGS. 6 and 7, with these slits or equivalent areas being designed to have the reinforcing strip pass through or over them.

The lower inserts 20 are designed to act as points for the seat back to pivot on the seat pan. Upper insert 21 acts as a support for a seat back locking device, for example. Insert 25 serves solely as a 90° change-of-direction point for the reinforcing strip. Insert 26 is an additional insert, intended for example to support a safety belt reel, situated on a straight section of strip 10 in the top of the seat back.

The ends 11 of the strip are firmly joined together once the strip has been passed through the slits in the various inserts. With this method of assembling the ends of the strip, insert 26, which features for this specific purpose two parallel slits 27 through which the two ends of the strip are passed while being held one on top of the other, providing a kind of mechanical anchoring that further improves the strength of the joint between the two ends of the strip.

The assembly formed by strip 10 and the interconnected inserts 20, 21, 25, 26 is embedded in a body 30 made from a glass-fibre reinforced thermoplastic material, which overmoulds the entire strip and at least part of each insert.

A 1-mm thick closing plate 40, for example, is welded to the rear face of the frame, and can be given a finish covering of carpeting for example. This plate is preferably also made from a material such as TWINTEX® in order to constitute a reinforcing element that helps increase the rigidity of the seat back, and also a sufficiently resistant surface, in particular to act as a floor surface for the vehicle boot if the seat back is folded down, as is known and often demanded.

Figure 5:
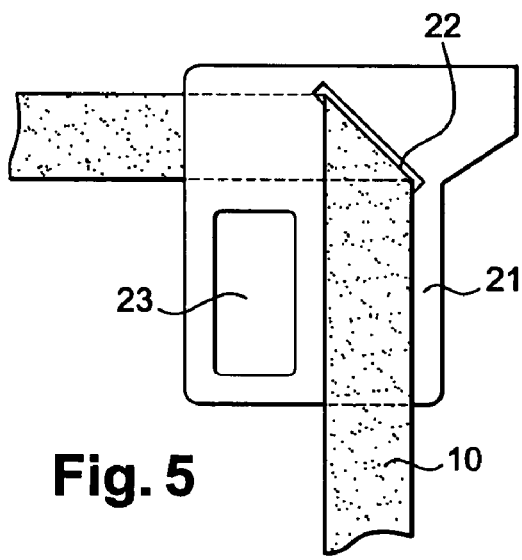
FIG. 5 depicts an insert that is entirely embedded in an overmoulded plastic material of the seat back frame.

FIG. 4 shows in particular that insert 20, intended to form an attaching pivot at the bottom of the seat back, features a section that protrudes from the body 30 formed by the overmoulded plastic. Insert 21, on the other hand, for which the example is shown in greater detail in FIG. 5, is entirely embedded in the overmoulded plastic material. Such an insert can feature a cutaway such as the rectangular hole 23, that can be used to attach other accessories or act as a passageway for other seat back accessories, in which case a matching passageway is also provided in the body 30 and closing plate 40.

Openings 31 can also be provided in the body 30, with matching cutaways 41 made in the closing plate 40, to serve as a feedthrough hole for skis or to accommodate an arm-rest, etc. Similarly, other inserts, which may or may not be joined to the strip, could be provided to allow the attachment of other accessories to the seat back, such as a headrest, safety belt reel, or to secure padding material or a lining cover.

Figure 6:
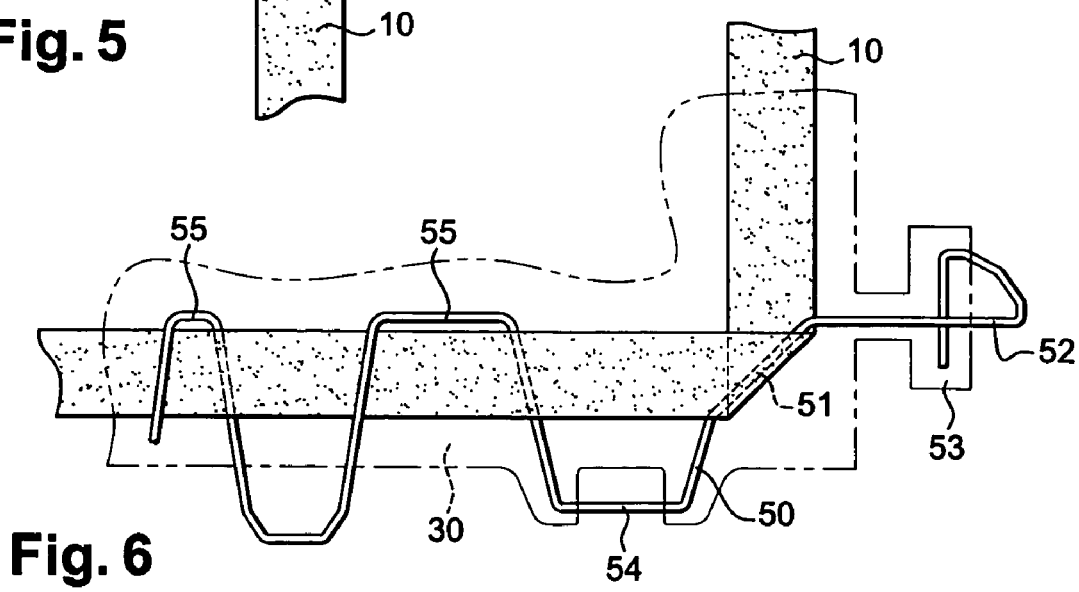
FIG. 6 illustrates an insert variant formed a metal wire that is suitably bent to fulfill several functions.

FIG. 6 illustrates an insert variant, formed in this case by a metal wire 50 suitably bent to fulfill several functions. An oblique section 51 serves as a support and change-of-direction point for the strip 10. An end section 52 bent back over itself acts as a reinforcement for the overmoulded trunnion. A visible horizontal section 54 serves as an attachment point for the attaching strap of a removable infant seat. Between these various sections the wire can feature intermediate joining areas 55 between which strip 10 can also be passed to increase the strength of the functional sections of the inserts.

Figure 7:
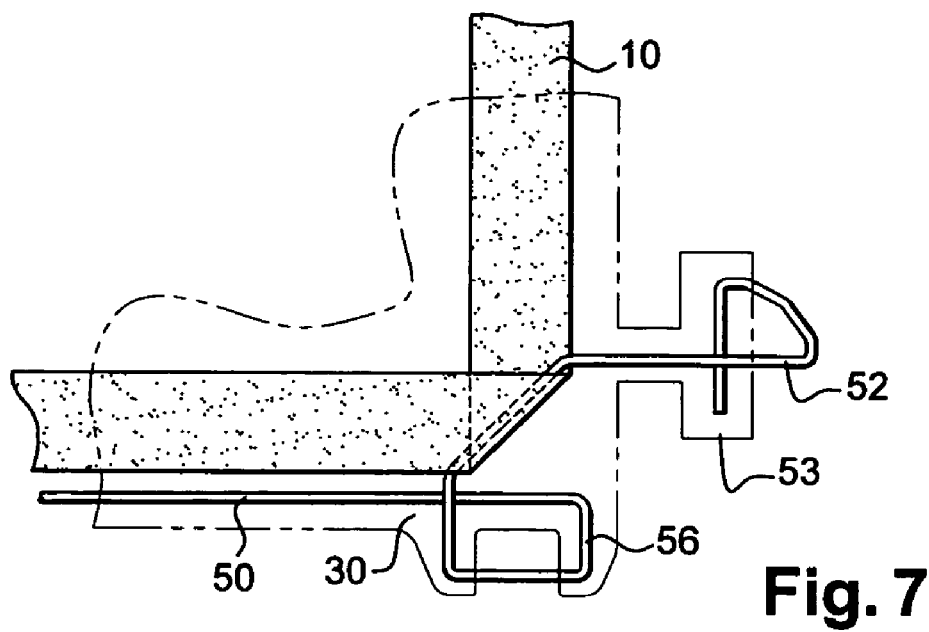
FIG. 7 shows another insert variant wherein the metal wire features a section that is bent to form a ring.

FIG. 7 shows another variant in which the wire 50 features a section 56 that is bent to form a ring.

Figure 8:
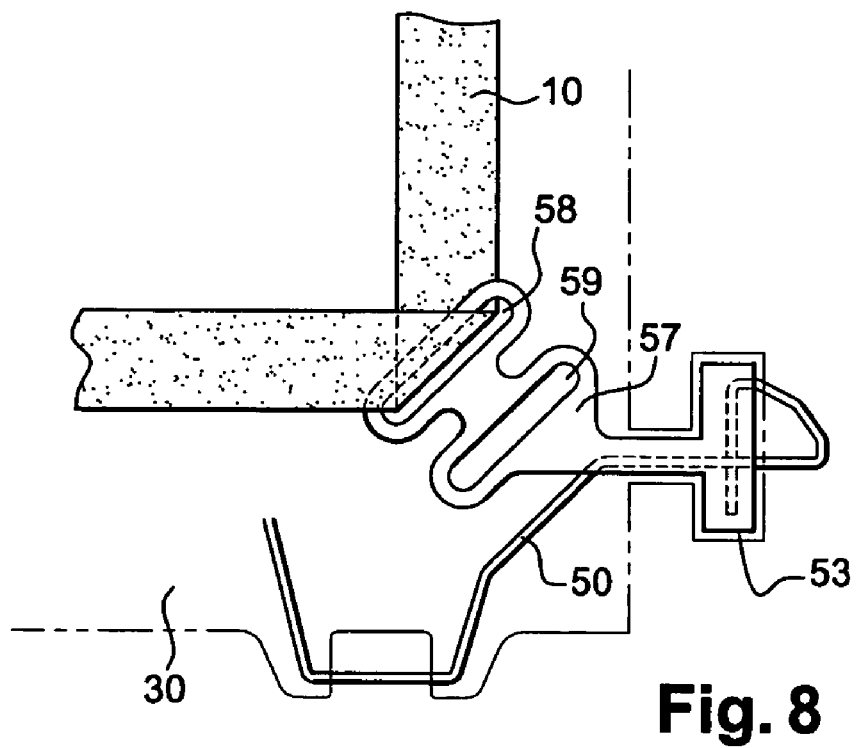
FIG. 8 shows another insert variant comprising a double insert featuring a wire section and a section formed by a metal plate.

FIG. 8 shows yet another variant with a double insert featuring a wire section 50 and a section formed by a metal plate 57 provided with a slit 58 through which the reinforcing strip 10 can be passed, and a slit 59 constituting a distortion loop that can deform if subjected to high loads without leading to direct rupture. The wire and the plate act simultaneously as a reinforcement for trunnion 53.

The seat back frame is manufactured as follows:

In the first stage, which can be carried out independently of the subsequent stages, the various inserts are stacked such that the slits or areas through which the reinforcing strip passes are aligned so that the strip can be passed through all the inserts at once. The strip 10 is passed through the slits 22, 27 of the various inserts or over the adapted oblique sections 51 of the inserts, and its two ends 11 are superimposed and heat-welded together, preferably at an insert such as insert 26, as indicated earlier. The strip/inserts assembly is then ready for use, and can be stored pending its use in the moulding of the seat back.

To produce the seat back, the preassembled strip/inserts assembly is attached to a supporting frame 70 provided with a handling ring as shown in FIG. 1. The inserts are held in position on the frame by appropriate fixtures 71, 72, and the strip 10 is tensioned very slightly.

The supporting frame 70 is transferred to a heating station, shown in FIG. 2, comprising two heating panels 80 between which the supporting frame carrying the reinforcing strip/inserts assembly is placed in order to heat it and permit adequate subsequent overmoulding of the TWINTEX® strip by ensuring partial plastification of the thermoplastic fibres of the strip and raising the temperature of the glass fibres and the inserts.

The preheated assembly mounted on the supporting frame is then placed in an injection mould designed for this purpose, with the supporting frame 70 remaining outside the mould. Plastic material reinforced with long glass fibres is injected into the mould and overmoulded on the assembly, which is still held on the supporting frame.

The supporting frame bearing the resulting seat back frame comprising the body 30 overmoulding the strip 10 and inserts 20, 21, 25, 26 such as is shown in FIG. 3, is used to remove the seat back frame from the mould and transfer it to a workstation where an operator unhooks it from the supporting frame.

At a welding station, the closing plate 40 is applied against the body 30 as shown in FIG. 4 and joined to it by vibration welding.

The seat back frame assembly can then be stored for later use.

The invention is not limited to the examples and methods of production described above purely as examples. An experienced craftsman could adapt these examples without difficulty by changing the shapes and number of inserts, and the positioning of the reinforcing strip.

What is claimed:

1. An automobile vehicle seat back frame comprising:
   a body extending generally over a plane and produced as a one-piece part in molded plastic material, and
   at least two functional components joined to the body for the body's attachment or reinforcement, the functional components comprising inserts at least partially overmolded by the plastic material of the body,
   wherein the body is strengthened by a reinforcing strip embedded in and substantially fixed by the plastic material of the body, the reinforcing strip extending generally in the plane of the body and positioned proximate the perimeter of the frame such that the reinforcing strip interconnects at least two of the functional components.

2. An automobile seat back frame in accordance with claim 1, wherein the functional components comprise frame attaching components or reinforcing parts.

3. An automobile seat back frame in accordance with claim 1, wherein the reinforcing strip comprises a woven band of glass fibres and thermoplastic fibres.

4. An automobile seat back frame in accordance with claim 1, wherein the plastic material of the body of the frame comprises a thermoplastic material.

5. An automobile seat back frame in accordance with claim 1, wherein the plastic material comprises a thermoplastic material filled with glass fibres.

6. An automobile seat back frame in accordance with claim 1, wherein the inserts comprise obliquely angled slits or cutaways through which the reinforcing strip is passed.

7. An automobile seat back frame in accordance with claim 1, wherein the inserts interconnected by the reinforcing strip are formed from a metal wire bent to shape and featuring oblique sections around which the reinforcing strip is passed.

8. An automobile seat back frame in accordance with claim 1, wherein the plastic material overmolds simultaneously at least a portion of the inserts and at least a portion of protruding sections of the inserts to form functional parts comprising reinforced protruding sections.

9. An automobile seat back frame in accordance with claim 1, further comprising a closing plate attached to the frame body to form a rear surface of a seat back.

10. An automobile seat back frame in accordance with claim 9, wherein the closing plate comprises a fibre-reinforced thermoplastic composite material.

11. An automobile seat back frame in accordance with claim 1, wherein the reinforcing strip comprises a woven band of mineral end plastic material fibres.

* * * * *